United States Patent [19]
Martenas

[11] 4,393,644
[45] Jul. 19, 1983

[54] TWO-SPEED DRIVE APPARATUS FOR BLOWER FANS

[75] Inventor: Wayne B. Martenas, New Holland, Pa.

[73] Assignee: Sperry Corporation, New Holland, Pa.

[21] Appl. No.: 289,869

[22] Filed: Aug. 4, 1981

[51] Int. Cl.³ .......................... A01D 87/10; B02B 1/02
[52] U.S. Cl. ...................................... 56/12.8; 56/13.3; 56/13.4; 241/60
[58] Field of Search ..................... 56/12.8, 13.4, 13.9; 74/750 R, 760, 762, 763, 781 R; 241/222, 60

[56] References Cited
U.S. PATENT DOCUMENTS
2,806,565  9/1957  Rosenthal et al. ............... 74/781 R
3,730,441  5/1973  Waldrop et al. .................... 241/60

Primary Examiner—Gene Mancene
Assistant Examiner—James Hakomaki
Attorney, Agent, or Firm—Darrell F. Marquette; Frank A. Seemar; Larry W. Miller

[57] ABSTRACT

The blower of a forage harvester is controlled by two-speed belt drives for operating the blower between a first and a second speed for improved power requirements and operating efficiency. The disadvantages of such belt drives is avoided by a selector apparatus which controls a single speed rotating input and provides a two-speed rotating output.

7 Claims, 3 Drawing Figures

TWO-SPEED DRIVE APPARATUS FOR BLOWER FANS

BACKGROUND OF THE INVENTION

This invention relates generally to solid material comminution or disintegration apparatus having a rotary striking member and a controlled discharge mechanism and, more particularly, to apparatus for controlling the speed of a blower in a forage harvester.

The required blower speed of a forage harvester varies from crop to crop and from one crop condition to another. It is known that running a blower at a faster than required speed requires increased power and results in lower efficiencies. Thus it is desirable to have a blower capable of running at two speeds to develop optimum efficiency.

In the past, some forage harvesters have had two speed belt driven blowers which require a drive belt, driven sheave and/or drive sheave which had to be replaced by another part or switched with another part when a speed change was desired. This was time consuming, utilized extra space and may even require locating the blower in an unwanted location.

The foregoing illustrates limitations of the known prior art. Thus, it is apparent that it would be advantageous to provide an alternative direct to overcoming one or more of the limitations as set forth above. Accordingly, a suitable alternative is to provide apparatus which controls a single speed rotating input and provides a two-speed rotating output without the need for changing belts and sheaves.

SUMMARY OF THE INVENTION

In one aspect of the present invention, this is accomplished by providing a two-speed drive apparatus including a rotatable input shaft and a fixed member adjacent one end of the shaft. A first gear is connected to rotate with the input shaft and a second gear is mounted on the input shaft. The second gear can be selectively connected to either of the input shaft and the fixed member. Another gear interconnects the first and second gears. An output member is connected for movement in response to movement of the input shaft.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
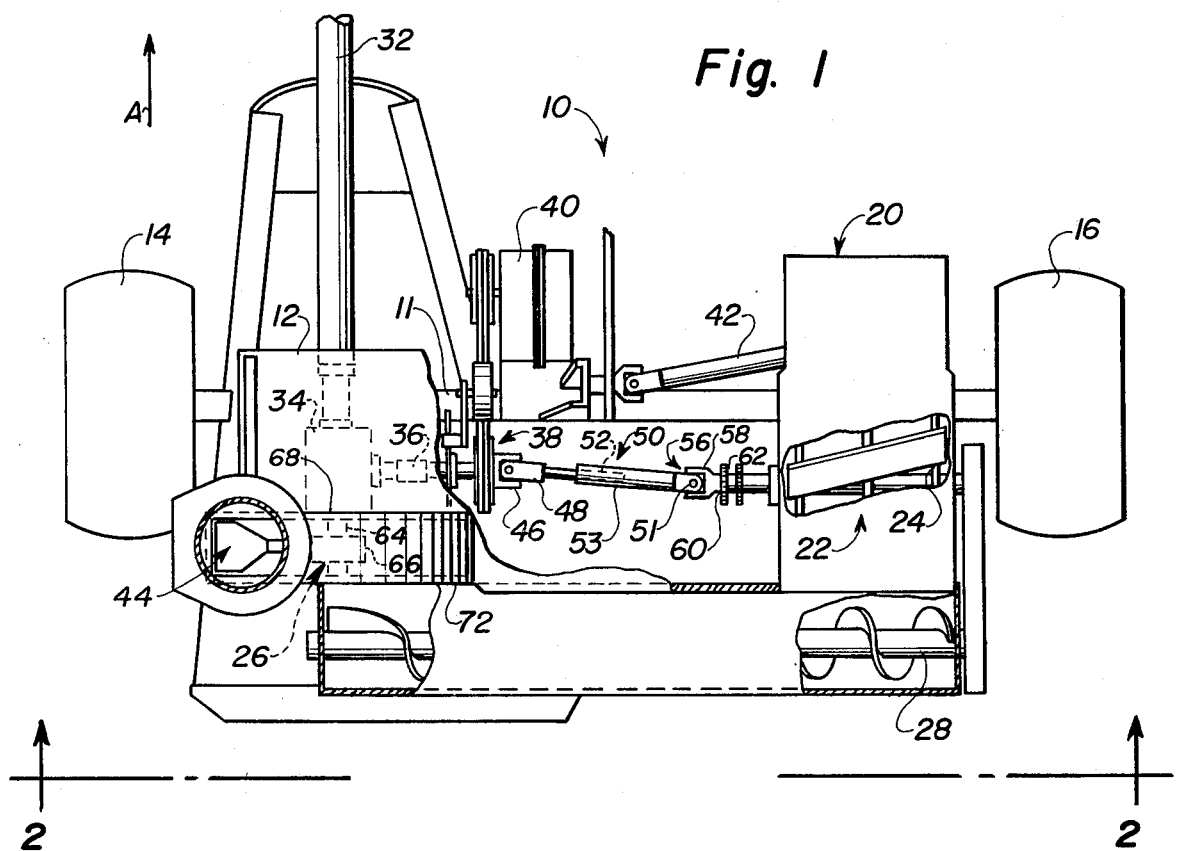
FIG. 1 is a plan view illustrating an embodiment of a forage harvester utilizing a blower speed control apparatus.
Figure 2:
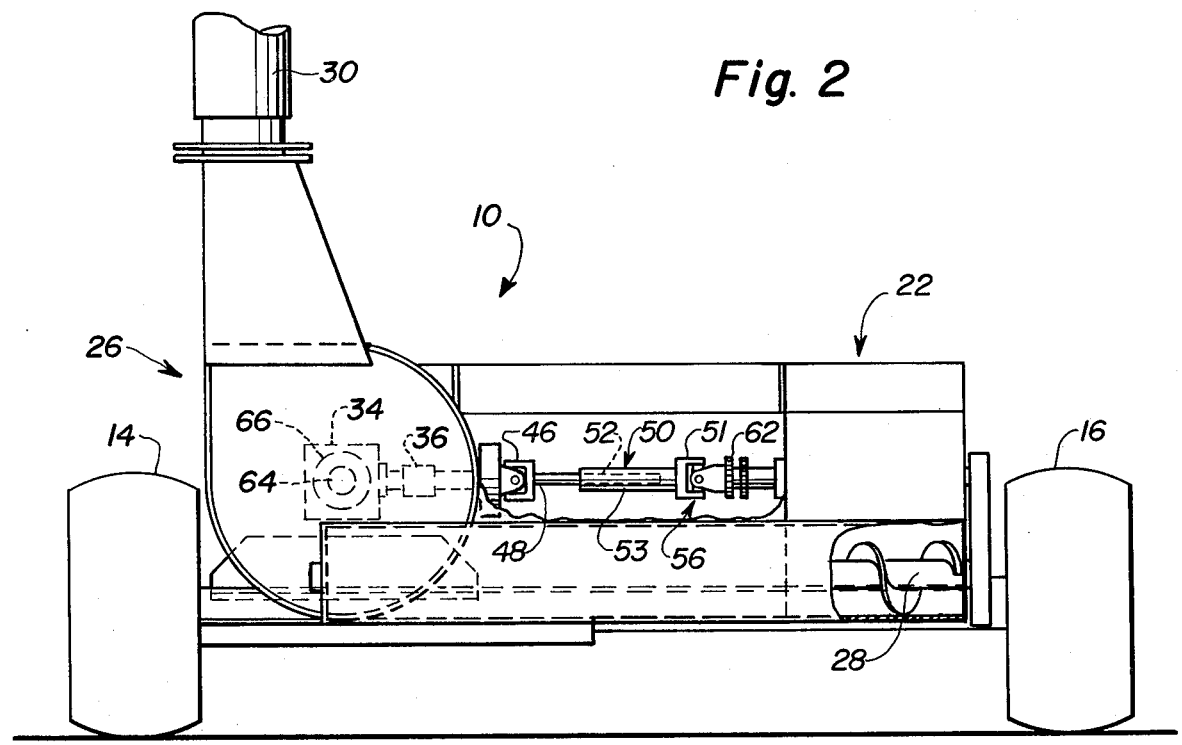
FIG. 2 is a view taken along line 2—2 of FIG. 1.

An exemplary pull-type forage harvester 10 has a transverse main frame 11 with a transversely extending square support beam 12 supported on ground engaging wheels 14,16, at the respective ends of the beam. The harvester is drawn in direction A by a tubular hitch (not shown) pivotally connected to the left end (or inboard) portion of beam 12. On the outboard end is a feed roll mechanism 20 which receives harvested crop material from a pickup or row attachment and meters material to a cutterhead 22. The cutterhead has a rotatable cutting reel 24 which has a plurality of blades positioned around its periphery which chop the incoming crop material in cooperation with a shear bar (not shown) in a well known manner. The small pieces of chopped crop material form a silage which is conveyed from the cutting reel 24 to the forage blower 26 by a transverse feed auger 28 positioned along the rear of the harvester. The blower discharges the silage into a trailing wagon (not shown) through a rearwardly extending adjustable spout 30 (FIG. 2).

Power is delivered to the operating mechanism by main drive shaft 32 extending from the tractor power takeoff PTO (not shown). The fore-and-aft main drive shaft 32 is connected to the main input gearbox 34 mounted on the inboard end of the forage harvester. The main gearbox contains a drive shaft 36 through which it delivers power to the various components on the outboard side of the forage harvester. The feed roll mechanism is driven from drive shaft 36 through a belt and pulley drive 38, reduction gearbox 40 and connecting drive 42. The fan 44 of the blower 26 is mounted and driven by the main drive shaft 32.

Connected to the end of the drive shaft 36 is universal joint 46. The universal joint secures end 48 of transmission member 50 to the drive shaft. Transmission member 50 comprises rod 52, of which end 48 is connected to the universal joint, and cylinder 53 into which the remaining portion of rod 48 is inserted. Cylinder 53 contains a rubber seal (not shown) placed between the rod and inner walls of the cylinder. This rubber seal eliminates any harmful torsional forces from being exerted on the cylinder. Connected to the other end transmission member 50 is coupling assembly 56. The coupling assembly comprises a U-shaped connector 58 adapted to receive end 51 of the transmission member. Coupling assembly 56 also contains a sleeve portion 60, and sprocket 62 rigidly mounted to the sleeve. Although the foregoing description generally relates to a pull-type forage harvester, the description is exemplary only. It should be kept in mind that the invention described more specifically hereinafter, can be used with other types of pull-type harvesters and also with self-propelled harvesters.

A rotating shaft 64 is an extension of main drive shaft 32 and operates from gearbox 34 at the single input speed of shaft 32, e.g., 1000 rpm, to drive blower 26. A novel two-speed planetary apparatus 66 of blower 26 is drigen by shaft 64 to provide a means having a single speed rotating input for producing a two-speed rotating output. By two-speed rotating output is meant that in a first mode, fan 44 is rotated at substantially 1000 rpm which is the input speed of shaft 64. In a second mode, fan 44 is rotated at a substantially reduced speed of about 700 rpm. Although blower 26 is illustrated herein for use with a forage harvester, it will be clearly understood that the novel two-speed feature of planetary apparatus 66, to be hereinafter described in detail, is adaptable for use on other agricultural machines with a single speed rotating input where a two-speed rotating output is desirable.

Figure 3:
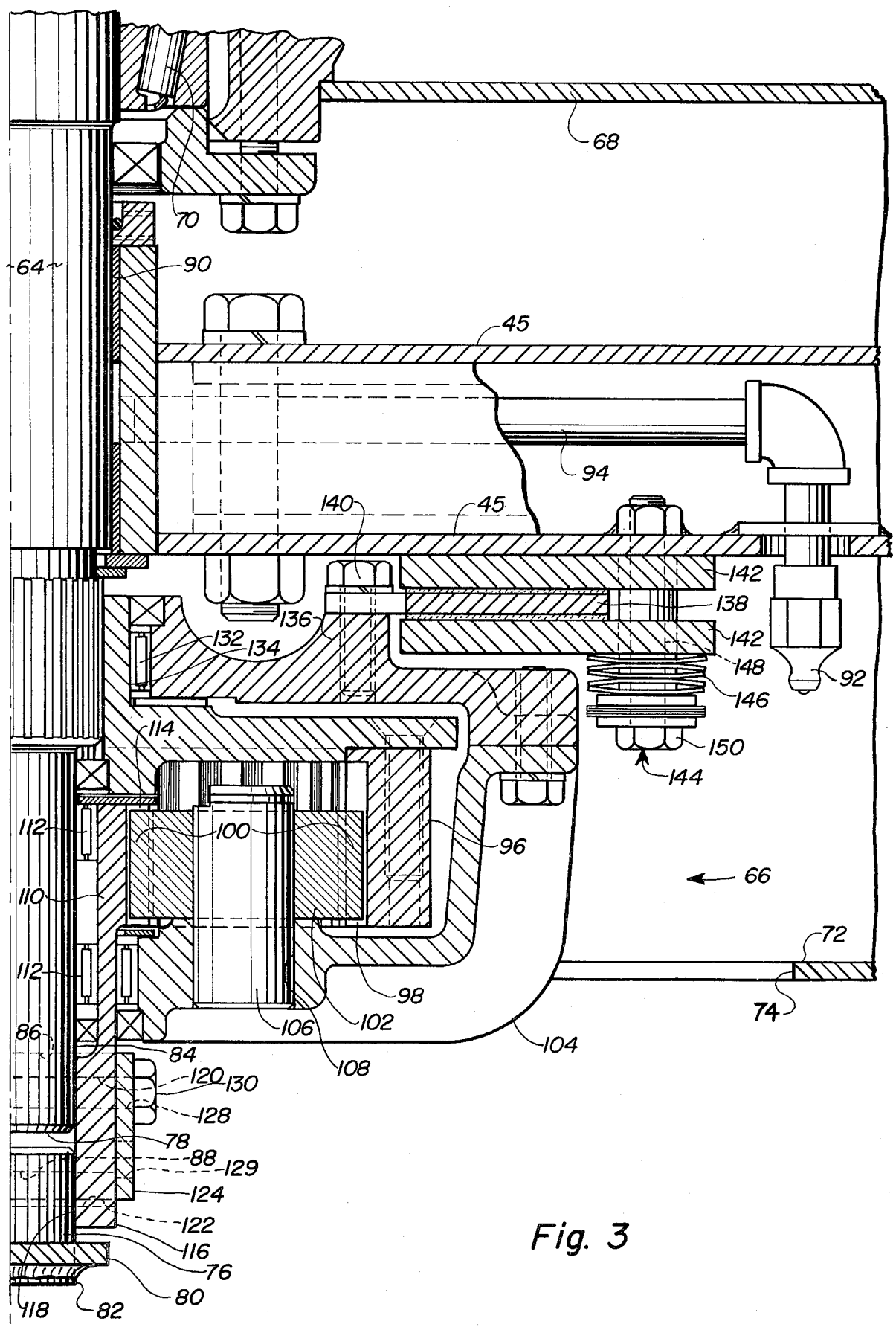
FIG. 3 is a detailed cross-sectional view illustrating an embodiment of a planetary apparatus for controlling blower speed.

Shaft 64 protrudes through front metal sheet 68 of blower 26 as seen in FIG. 3 and is bearing mounted at 70 for rotating between front sheet 68 and rear metal sheet 72. An opening 74 can be provided, if desired, in rear sheet 72.

A fixed member such as a torque arm 76 is provided adjacent an end 78 of shaft 64. Arm 76 is preferably welded to an extended flange 80 of harvester 10. Torque arm 76 is axially aligned with shaft 64 and has an outside diameter 82 which measures substantially the same as an outside diameter 84 of shaft 64. An aperture 86 is provided in shaft 64 adjacent end 78 transverse to the shaft axis. A similar aperture 88 is provided in torque arm 76.

A hub 45 of fan 44 is mounted on shaft 64 at bushing 90 for rotation on shaft 64. A lubrication fitting 92 and conduit 94 are operably connected for conducting lubricant to bushing 90.

A ring gear 96 is splined to shaft 64 for rotation therewith. Gear 96 has teeth 98 intermeshed with teeth 100 of a planetary gear 102 which is connected to a planet carrier 104 via a press fit pin member 106 inserted through gear 102 and pressed into a bore 108 formed in carrier 104.

A sun gear 110 is bearing mounted at 112 on shaft 64. Sun gear 110 includes teeth 114 intermeshed with teeth 100 of planetary gear 102. Sun gear 110 includes an extended portion 116 which forms a sleeve having an inside diameter 118 in simultaneously abuttment with outside diameters 84,82 of shaft 64 and torque arm 76, respectively. An aperture 120 formed in extended portion 116 is aligned with aperture 86 of shaft 64 and another aperture 122 in portion 116 is aligned with aperture 88 of torque arm 76.

A tubular ring or sleeve 124 is in sliding engagement with an outer peripheral surface 126 of extended portion 116 of sun gear 110. At least one aperture 128, and, preferably, another aperture 129, is formed in sleeve 124. Thus, apertures 128,129 can be moved into alignment with apertures 120 and 122 of sun gear 110 and apertures 86,88 of shaft 64 and torque arm 76, respectively. A pin 130 can be removably inserted through the aligned apertures thus securing sun gear 110 to either of shaft 64 for rotation therewith and to torque arm 76 for maintaining sun gear 110 stationary relative to any rotation of shaft 64.

Planet carrier 104 is bearing mounted at 132 on a surface 134 of ring gear 96. A portion 136 of carrier 104 carries a friction plate 138 attached thereto by bolt 140. Plate 138 extends between a pair of opposed clutch plates 142 one of which is resiliently urged toward another for frictional engagement with plate 138. Such resilient urging is accomplished by a bolt 144 connecting clutch plates 142 and hub 45 and including a plurality of resilient washers 146 retained in compression on a shaft 148 of bolt 144 between a bolt head 150 and one of the clutch plates 142.

With the parts assembled as set forth above, and specifically when it is desired to move fan 44 at the same rpm of input shaft 64, ring 124 is moved to a position wherein pin 130 is simultaneously engaged with apertures 128,120 and 86 so that sun gear 110 is fixedly connected for rotation with input shaft 64. In this first mode, since sun gear 110 and ring gear 96 are both connected to rotate with input shaft 64, planetary gear 102 is restrained from rotation on pin 106. As a result, gear 102 revolves about shaft 64 without rotating about the axis of pin 106. Thus, planet carrier 104 is rotated to drive fan 44 at the rotational speed of input shaft 64.

In the second mode, when it is desired to move fan 44 at a reduced rmp relative to input shaft 64, ring 124 is moved to a position wherein pin 130 is simultaneously engaged with apertures 129,122 and 88 so that sun gear 110 is fixedly connected with torque arm 76. Sun gear 110 is now fixed in position relative to rotating input shaft 64, planetary gear 102 now rotates freely on pin 106 and simultaneously revolves around shaft 64. Thus, gear teeth 100 of gear 102 walk around gear teeth 114 of sun bear 110. As a result, planet carrier 104 rotates and drives fan 44 at an rpm equal to the rpm of input shaft 64, times the number of teeth 98 on ring gear 96, divided by the sum of the number of teeth on ring gear 96, and the number of teeth of sun gear 110.

The foregoing has described apparatus which controls a single speed rotating input and provides a two-speed rotating output without the need for changing belts and sheaves.

It is anticipated that aspects of the present invention, other than those specifically defined in the appended claims, can be obtained from the foregoing description and the drawings.

Having thus described the invention, what is claimed is:

1. In an agricultural machine including a frame, a blower fan supported on said frame for discharging crop material from said agricultural machine, and a main drive shaft supported on said frame for driving said blower fan, the improvement comprising:
   (a) an input shaft connected to be rotated by said main drive shaft;
   (b) said blower fan connected to rotate on said input shaft;
   (c) a first gear connected to rotate with said input shaft;
   (d) a second gear disposed on said input shaft;
   (e) a third gear interconnecting said first and second gears;
   (f) means connecting said third gear to said blower fan;
   (g) means for selectively fixing said second gear to either of said input shaft and said frame;
   (h) said blower fan being rotated at the same speed as said input shaft when said second gear is fixed to, and rotates with, said input shaft; and
   (i) said blower fan being rotated at a slower speed than said input shaft when said second gear is fixed to said frame.

2. The improvement of claim 1, wherein said first gear comprises a ring gear, said second gear comprises a sun gear, and said third gear comprises a planetary gear.

3. The improvement of claim 2, wherein said connecting means comprises a planet carrier supporting said planetary gear.

4. The improvement of claim 3, wherein said planet carrier encloses said ring gear, said sun gear and said planetary gear.

5. The improvement of claim 1, further comprising a fixed member mounted on said frame adjacent one end of said input shaft, and wherein said selectively fixing means includes a pin connectable with either of said input shaft and said fixed member.

6. The improvement of claim 5, further comprising a ring slidably mounted on said second gear for movement between a first position where said pin may connect said second gear only to said input shaft and a second position where said pin may connect said second gear only to said fixed member.

7. The improvement of claim 1 wherein said same speed is approximately 1000 rpm, and said slower speed is approximately 700 rpm.

* * * * *